United States Patent [19]

Haas, Sr. et al.

[11] 4,417,508

[45] Nov. 29, 1983

[54] WAFER BAKING OVEN

[76] Inventors: Franz Haas, Sr., Gerstlgasse 25, A-1210 Wien; Franz Haas, Jr., Kreuzgasse, A-2100 Leobendorf; Johann Haas, Seitweg 4, A-3400 Klosterneuburg, all of Austria

[21] Appl. No.: 376,953

[22] Filed: May 11, 1982

[30] Foreign Application Priority Data

May 11, 1981 [AT] Austria ............................. 2092/81

[51] Int. Cl.³ .................................... A47J 37/00
[52] U.S. Cl. ....................................... 99/355; 99/373; 99/344; 99/375; 99/382; 432/242
[58] Field of Search ................. 99/352, 355, 372, 373, 99/374, 375, 381, 382, 383, 427; 432/242; 52/578, 579

[56] References Cited

U.S. PATENT DOCUMENTS

| 2,200,619 | 5/1940 | Fallon | 432/242 |
| 3,338,188 | 8/1967 | Booth | 99/373 X |
| 3,461,823 | 8/1969 | Greco | 99/383 X |
| 3,982,887 | 9/1976 | Zendziora et al. | 432/242 X |
| 4,274,331 | 6/1981 | Jensen et al. | 99/374 X |
| 4,309,167 | 1/1982 | Kurz et al. | 432/242 X |

FOREIGN PATENT DOCUMENTS 224040 4/1962 Austria ................................. 99/373

1257705 1/1968 Fed. Rep. of Germany ........ 99/355

Primary Examiner—Billy J. Wilhite
Assistant Examiner—Christine A. Peterson
Attorney, Agent, or Firm—Schwartz, Jeffery, Schwaab, Mack, Blumenthal & Koch

[57] ABSTRACT

A wafer baking oven has a set of baking tongs which move through the oven to effect baking of the wafers. The oven is particularly for wafer products such as flat wafers, low hollow wafers, sugar cones, wafer cups and wafer figures. There is a baking chamber through which the baking tongs move and a front end at which baked wafers are discharged from the baking tongs and fresh batter is poured into the tongs for baking. The region in which this takes place is referred to as a front port. The front port includes a batter pouring station and a discharge station with a chute and at least one discharge spider. To reduce loss of heat and to reduce the noise level of the wafer oven, the front port is surrounded by a housing which comprises, at least in part, an enclosure attached to a frame. The housing has two passage openings at the side which face the baking chamber, and the baking tongs pass through these passage openings as they move in a circuit between the baking oven and the front port. There is also an outlet opening in the enclosed housing of the front port for the discharge of baked wafers.

64 Claims, 34 Drawing Figures

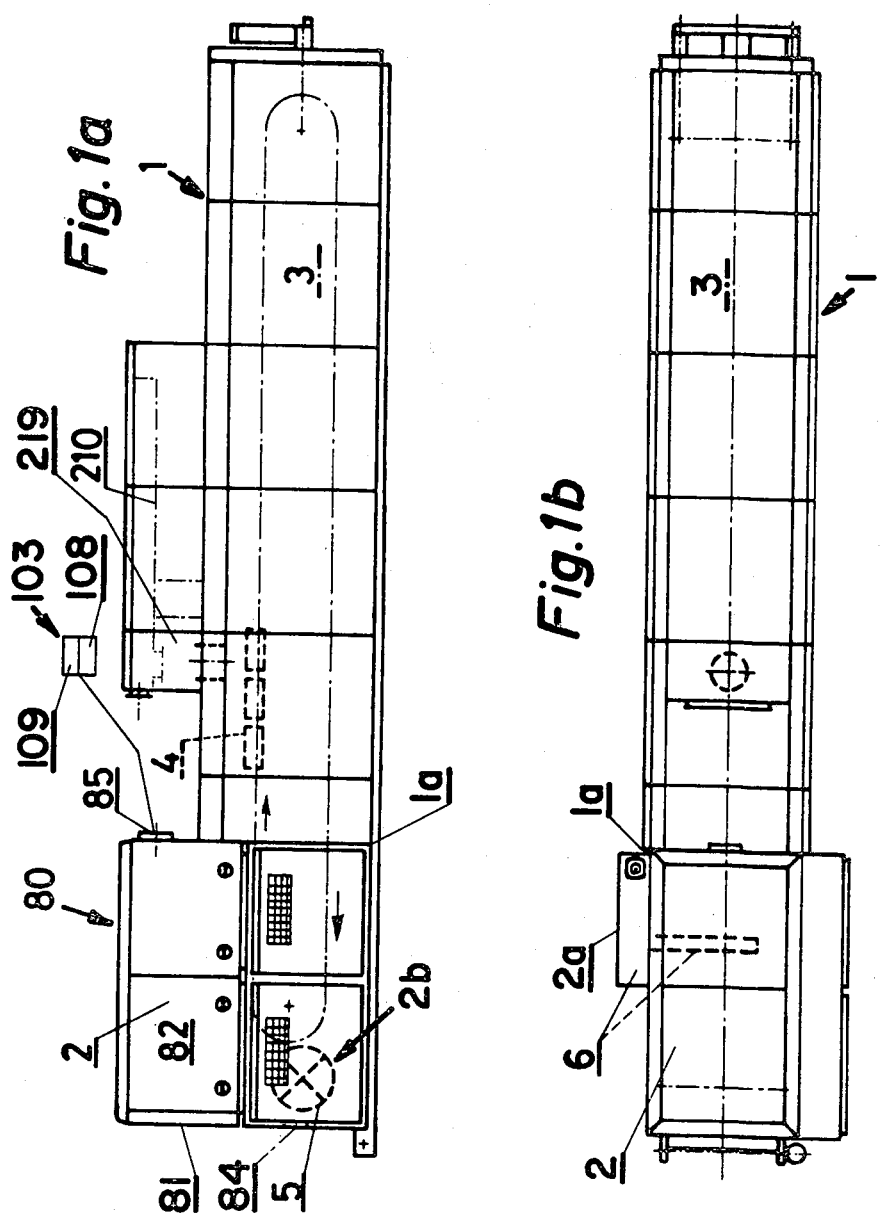

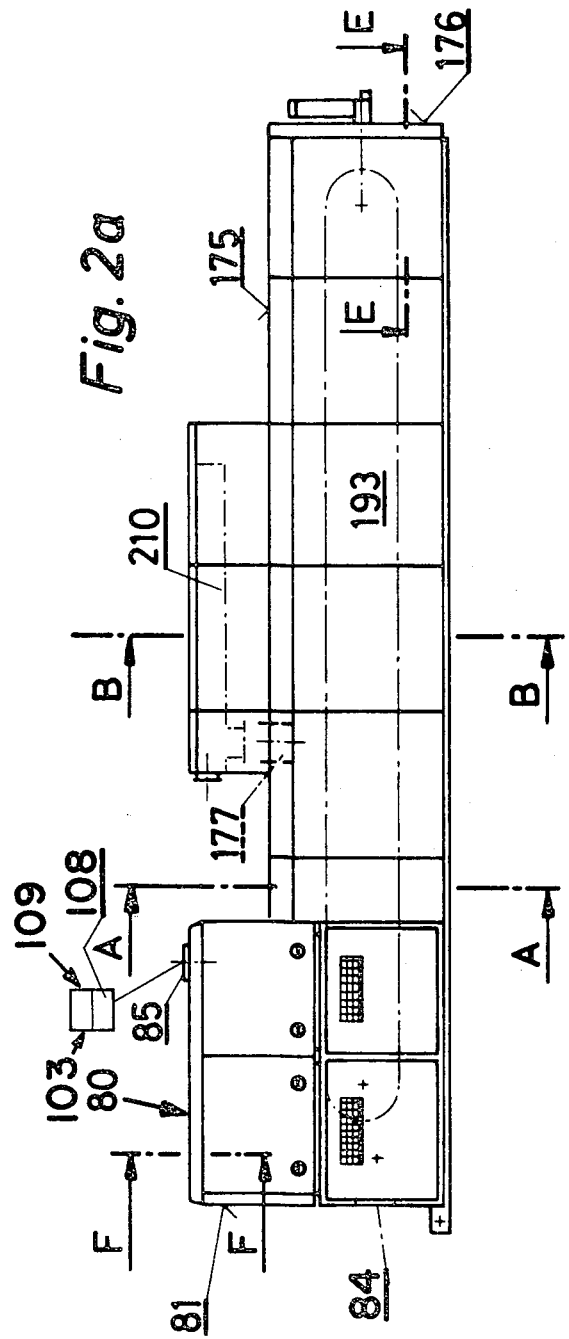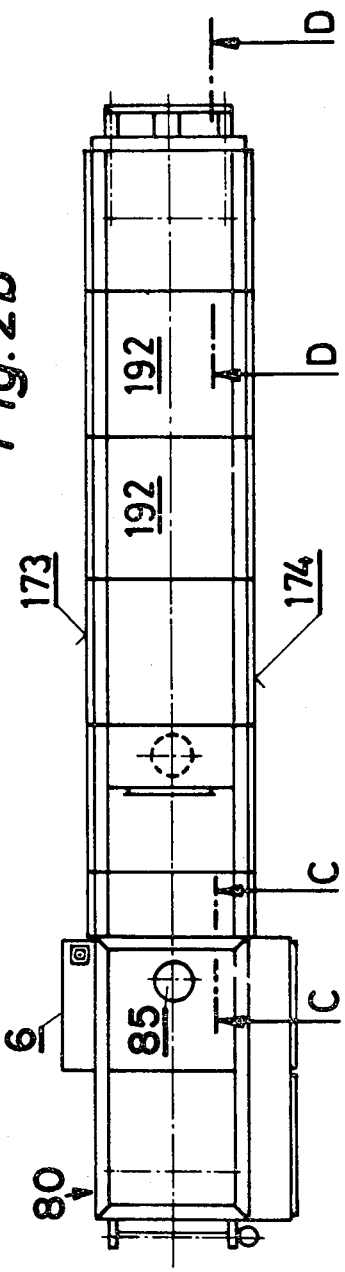

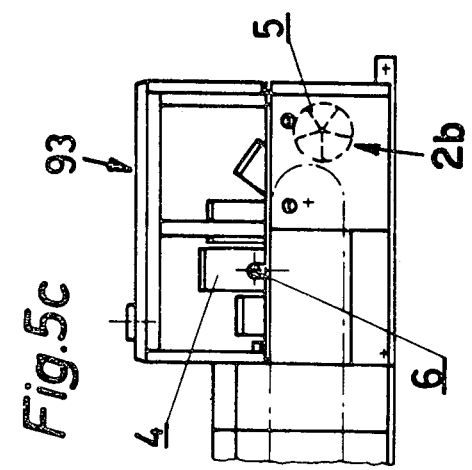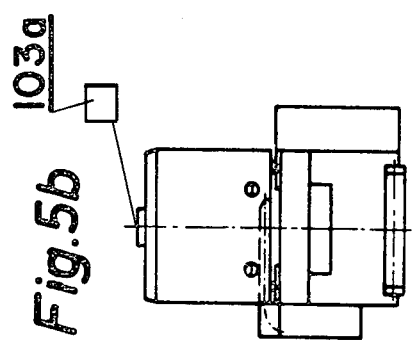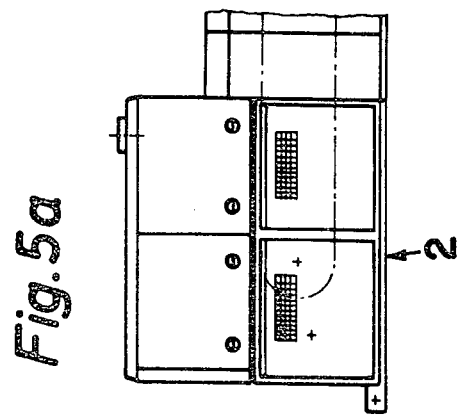

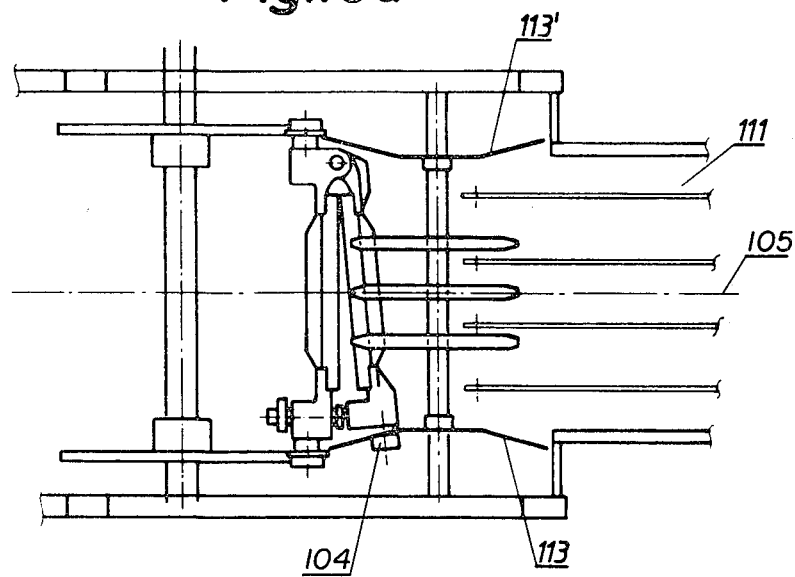

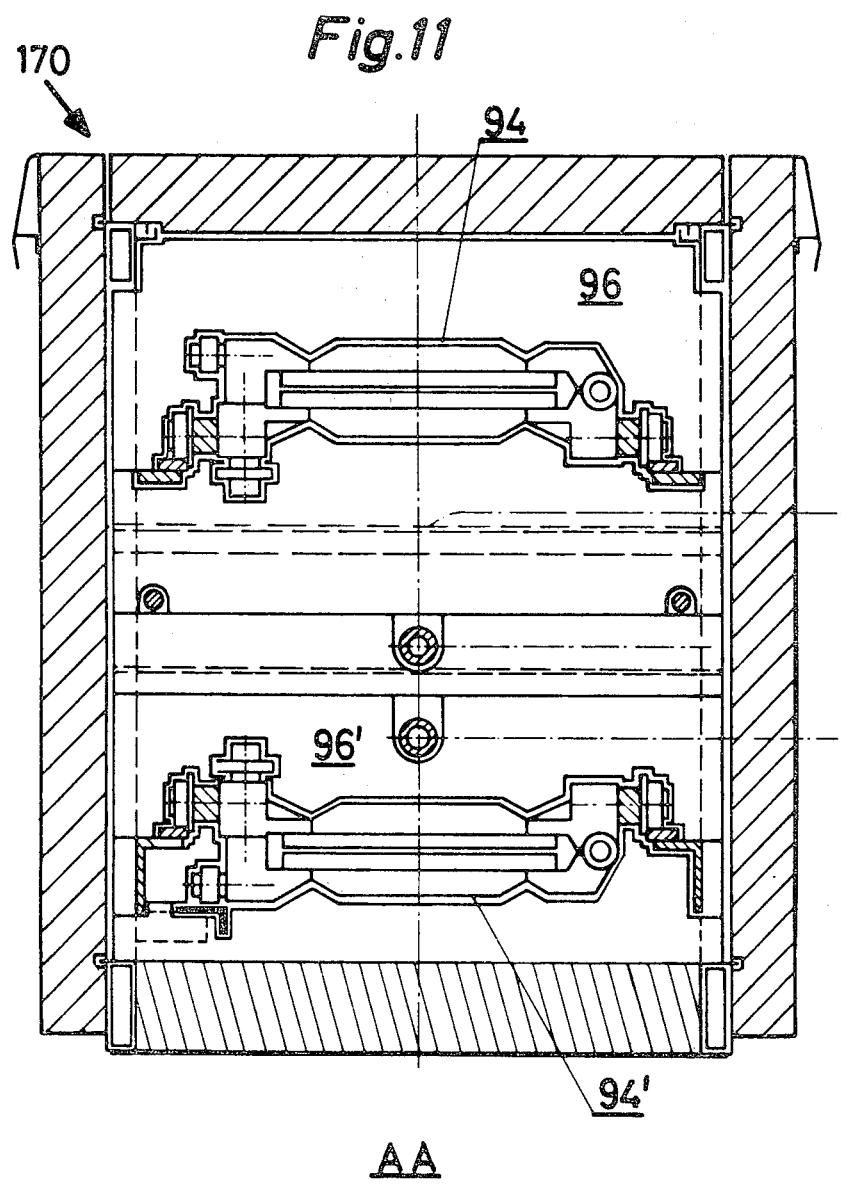

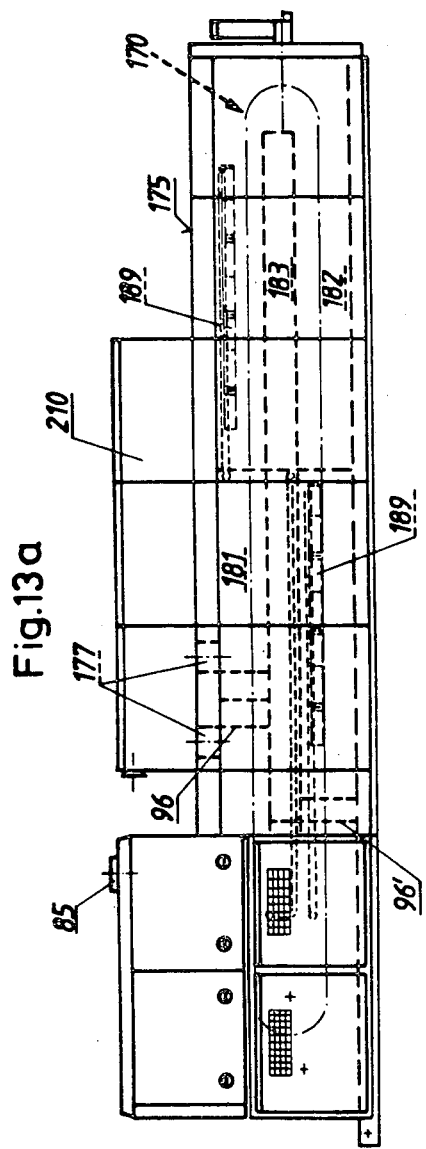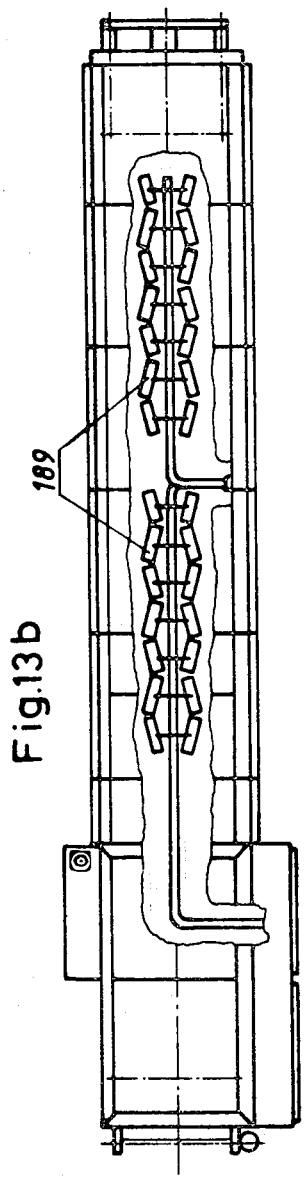

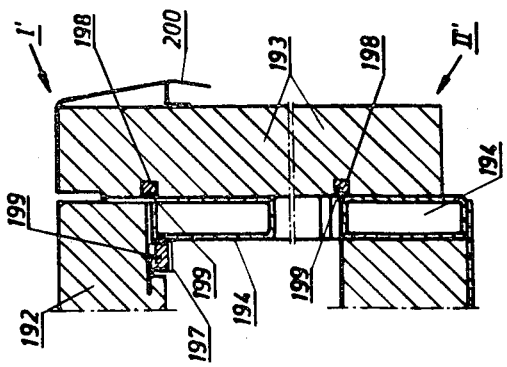
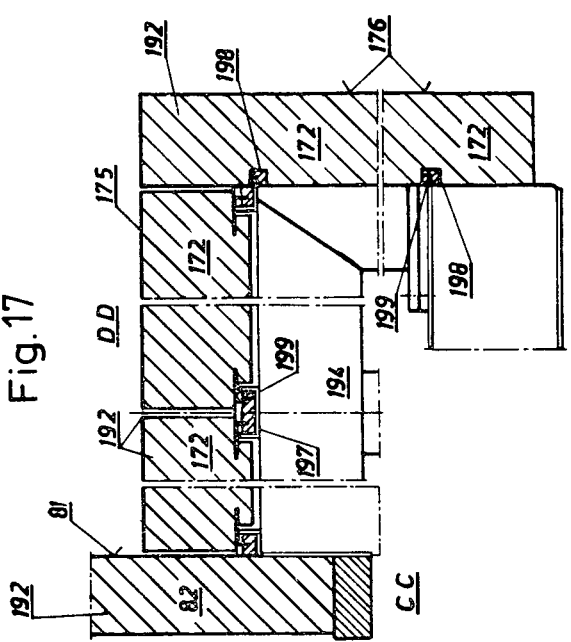

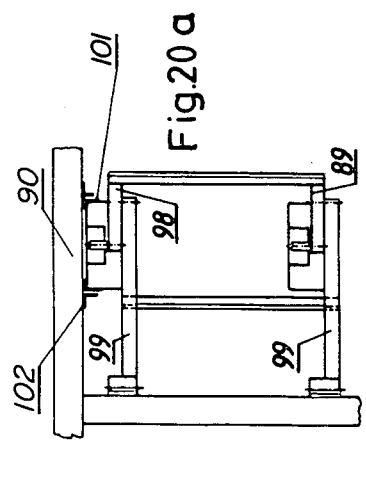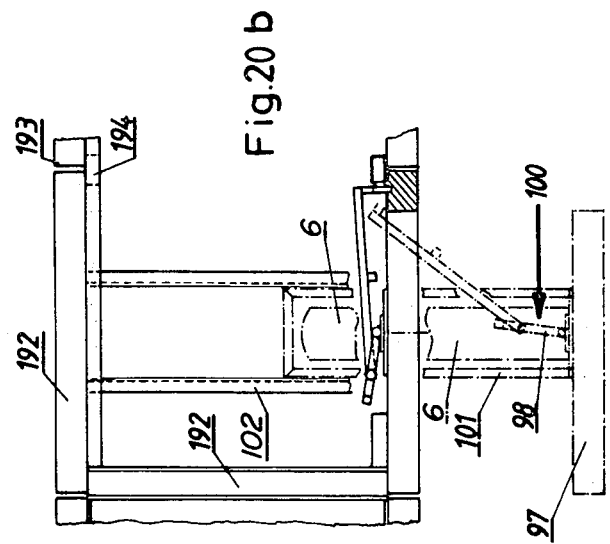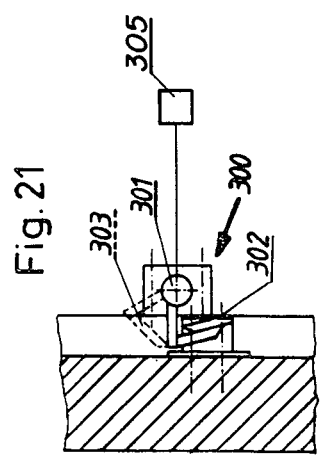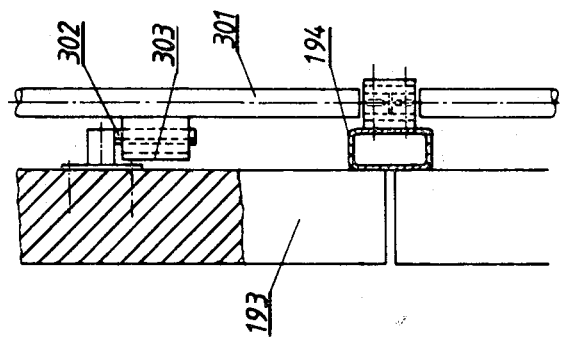

WAFER BAKING OVEN

BACKGROUND OF THE INVENTION

1. Technical Field of the Disclosure

The invention concerns a wafer baking oven with revolving baking tongs. Such an oven is used for making baked wafer products such as, for example, flat wafers, low hollow wafers, sugar cones, wafer cups and wafer figures.

2. Description of the Prior Art

Different machine-made wafer or waffle products are known in the food and confectionery industry. These products are distributed in the filled or unfilled state and are generally known as confectionery items. They may include, for example, wafer cones, wafer cups, wafer plates, flat wafer disks, hollow wafers, wafer rolls, ice cream cones, filled wafers, low hollow wafers, small filled wafer bars, wafer sections and the like. These wafer products are baked products of a crisp, brittle, crunchy, fragile texture, made of wafer dough, baked to the greatest dryness possible and having a very low humidity content.

Different individual wafer products may be prepared in different ways. Thus, certain wafer products are baked in their final shape, such as, for example, wafer cones, wafer cups, wafer disks, low hollow wafers and the like.

In the production of other wafer products, a sheet of wafers or an endless wafer strip is initially baked and is shaped into the final form when in a soft baking state. Then, the wafer product is cooled, and it assumes its crisp, brittle texture. Examples of this type of product are sugar cones for ice cream, hollow wafers, sugar wafer rolls, and the like.

To produce certain other types of wafer products, several sheets of wafers are baked, cooled, covered with cream and stacked into a block of wafers. This cream-filled wafer block or wafer sandwich is subsequently cut into small, readily handled pieces of equal size, which are packed into units containing one or several pieces and which may be packaged in an airtight manner.

The different wafer products may be provided with coatings for example of sugar or chocolate, depending on the product. Alternatively, they may be filled with different fillings, for example, ice cream, various creams, chocolate or the like.

The aforedescribed wafer or waffle products are different from the wafles baked by housewives in the conventional manner in waffle irons and representing a soft, roll or pancake-like baked product. These waffles made by housewives are not comparable with the above described wafer products of the wafer industry in relation to their consistency and applicability. Industrially produced wafers, which are baked in their final form, such as, for example, wafer cones, wafer cups, wafer figures and the like, and the individual wafers which are combined in a wafer product after being coated with a cream, such as, for example, flat wafers, wafer sheets and the like, are made in wafer baking ovens.

Wafer baking ovens are operated in most cases in a fully automatic manner, whereby liquid batter or dough is poured into wafer baking molds corresponding to the type of wafer desired. The baked wafers are then removed from the molds after the proper baking time. The wafer baking molds are arranged in opening and closing baking tongs which pass through the baking oven and are opened for the purpose of pouring the batter and removing the individual wafers from the molds. This is done in the front porch preceding the baking chamber of the wafer oven.

The wafer baking molds arranged in the baking tongs are of different configurations in keeping with the type of wafers to be produced in the wafer baking molds. Thus, the wafer mold for the production of wafer sheets or low hollow wafers consists of two baking sheets which are essentially flat on the batter handling side, except for the pattern for the wafer sheets and the recesses for the low, hollow wafers, in which case there are ledges on the side laterally closing off the cavity that exists when the molds are closed. For other types of wafers, such as, for example, wafer or sugar cones, the wafer baking mold comprises a two-part insert, one part being equipped with recesses for the wafer cones and representing a female mold, and the other part entering the recesses of the female mold when the mold is closed and representing a male mold.

The parts of the wafer baking molds are arranged in the baking tongs so that, when a baking tong is opened, the wafer molds also open for the insertion of the batter and the removal of the wafers.

Thus, for example, in the case of a wafer mold comprising two wafer baking sheets, one of the baking sheets is arranged in the bottom part and the other baking sheet in the top part of the tong. In the case of a wafer mold for wafer cones, the female mold with its opening mechanism is arranged in the bottom part of the tong and the male mold is arranged in the top part. The opening of the baking tong is effected either by the mutual pivoting of the two parts of the tong around a common axle or by the lifting of one part of the tong from the other.

In certain wafer baking ovens or automatic baking machines, the individual baking tongs are arranged in a chain of baking tongs. This chain of baking tongs is disposed in the baking chamber, and protrudes from one end of the chamber. The batter charging station and the wafer discharge station of the wafer oven are arranged in the vicinity of the end of the chain of tongs protruding from the baking chamber. Together they form the front port of the wafer baking oven.

During the operation of the wafer baking oven, batter is poured into the open wafer molds at the charging station in the front port. The molds are then closed and transported in the closed state through the baking chamber, wherein the wafers are baked in the course of their passage.

Following completion of the baking, the closed wafer molds arrive from the baking chamber at the front port and, specifically, at the wafer discharge station thereof. There, the baking tongs and the baking molds are opened, and the wafers are removed from the wafer oven. During the subsequent closing of the wafer molds at the charging station and during the baking process in the baking chamber, the water present in the wafer batter is evaporated in the form of steam. The latter must be removed from the area of the front port. This is effected in known wafer ovens in the area of the front port simply by arranging a vapor exhaust over the front port. In order to exhaust the steam from the area of the front port in this manner, a substantially larger volume of gas is exhausted through the exhaust hoods than necessary merely to remove the steam. The gas volume exhausted corresponds to 12 to 30 times the volume of the steam generated in the baking process.

A disadvantage of this process resides in the fact that, in spite of the large volumes of gas exhausted, requiring very high suction capacities, interference from the thermal radiation released by the rotating baking tongs cannot be eliminated. Furthermore, in the case of the known wafer ovens, the escape of steam from the front port into the environment may only be partially prevented.

SUMMARY OF THE INVENTION

It is therefore the object of the present invention to eliminate the aforementioned disadvantages and to provide an improved wafer baking oven which is also more energy efficient.

This object is attained, beginning with a wafer baking oven with revolving baking tongs, particularly for baked wafer products, such as, for example, flat wafers, low hollow wafers, sugar cones, wafer cups and wafer figures. A front port is disposed at the front end of a baking chamber traversed by the baking tongs, and this front port is equipped at least in part with a thermally insulating jacket. The front port contains a batter pouring station and a discharge station equipped with a chute or at least a discharge spider for the wafer products baked in the baking tongs. The front port may also be provided with an exhaust. The baking tongs are opened during their passage for the removal of the baked wafer products and closed following the pouring of the batter. According to the invention, the front port is surrounded, at least in part, by a housing formed by an enclosure mounted on a frame. The enclosure is provided with two passage openings for the baking tongs at the side of the enclosure facing the baking chamber. The housing is also equipped with an outlet opening, preferably self-closing, for the wafer products and may be equipped with an access opening to the batter pouring station. The wafer product discharge station is arranged within the housing.

It is an advantage of the apparatus of the invention that the escape of steam from the housing may be prevented effectively even if only a fraction of the volume of gas required heretofore is drawn off from the front port. The necessary suction capacity may thereby be reduced. Furthermore, the heat to be removed from the room housing the wafer oven is also reduced. The thermal radiation released by the revolving baking tongs to the environment is also reduced, and noise attenuation is made possible. According to a further characteristic of the invention, the housing is essentially completely closed with the exception of: the outlet opening for the wafer products, the passage openings for the tongs, and, optionally, at least one passage opening for baking waste. By means of the complete closing of the front port with the exception of the absolutely necessary openings, the exhaust capacity may be reduced to a value required for the exhaust of the steam itself and for the maintenance of a slight underpressure in the front port. The escape of steam into the surrounding room is thereby completely prevented. Furthermore, thermal radiation from the baking tongs into the environment of the front port is prevented and maximum sound attenuation of the front port attained. The reduction of the exhaust capacity, on the one hand, and the elimination of the escape of hot air from the environment of the oven, on the other, effects energy conservation.

A further characteristic of the invention resides in the fact that the housing is equipped with a door, arranged in a lateral wall, pivotable preferably into a position approximately perpendicular to the direction of motion of the baking tongs and a position parallel to the direction of movement of the tongs. This door carries a batter pouring device. In this manner, the wafer baking oven is closed, while providing good accessability to the batter pouring station.

Yet a further characteristic of the invention resides in the fact that the enclosure forming the housing is composed of, at least in part, individual panels or doors, joined to each other and mounted preferably in a removable manner on the frame. This arrangement assures optimum access to the inside of the oven at all of the necessary locations. In this regard, the term "panel" is sometimes used herein to encompass both panels and doors.

The invention further conveniently provides that the panels or doors are sealed at their edges against each other and/or the frame. This allows a complete sealing of the enclosure.

In order to assure the complete sealing of the enclosure, a further characteristic of the invention provides that the panel seals between the panels and/or doors and between the panels and the oven frame are in the form of labyrinths.

Each seal may consist further according to the invention of a ledge extending into the inside of a C beam or a groove.

To prevent the passage or air or gas through the seals, the invention alternatively provides that a heat resistant gasket meaterial is arranged inside the C beam or the groove, with the ledge engaging with or abutting against said gasket material in the closed state of the door and in the assembled state of the panels.

According to a further characteristic of the invention, the doors and/or panels of the enclosure may be bolted from the inside of the enclosure in the closed or assembled state, with the bolting of at least part of the doors or panels being remote actuable, preferably by a remote control operator, such as electric or pneumatic means. This arrangement prevents the unintentional opening or removal of parts of the enclosure during the operation of the wafer oven.

Another characteristic of the invention provides that the side of the housing facing the baking chamber has two sections arranged vertically and each is equipped with a passage opening for the baking tongs. One section is equipped with a passage opening which cooperates with the upper track of the baking tongs and is offset rearwardly with respect to the other section, i.e, the section of the partition equipped with a passage opening which cooperates with the lower track of the baking tongs. This arrangement reduces the volume of steam generated in the baking chamber, as the largest portion of the steam is generated immediately following the closing of the baking tongs and thus immediately following closing of the wafer molds. In this regard, each tong on its upper track does not leave the front port immediately following the placing of the batter into the wafer mold, nor does it leave the front port immediately following the directly subsequent closing of the baking tong. Rather, it enters the baking chamber of the wafer oven only after passing through the passage opening of the rearwardly offset section.

A further characteristic of the invention resides in the fact that the passage openings for the baking tongs have an outline corresponding essentially to the cross section of a baking tong taken perpendicularly to its running direction. This assures that the atmosphere in the front port is extensively separated from that of the baking chamber. The cross section of a baking tongs perpendicular to its running direction is herein defined as the cross section of all of the parts which move with the baking tong on its track, i.e., both the tong itself and its baking molds, and the transport device for the baking tongs (for example, a conveyor chain).

Depending on the configuration of the wafer molds contained in a baking tong, according to another characteristic of the invention, the cross section of the passage opening for the baking tongs is larger by 1–25%, preferably 5%, than the cross section of the baking tongs perpendicular to its running direction.

In order to achieve as complete a separation as possible of the atmosphere of the front port and the baking chamber, the invention provides that passage seals are located in the passage openings for the baking tongs. These are preferably labyrinth seals.

The passage seal for the baking tong passage openings may comprise, according to another characteristic of the invention, glass fiber elements, such as curtains or brushes, or the like, fastened to the housing wall.

A further characteristic of the invention provides that the labyrinth passage seal is formed by several vertical partition plates constituting at least part of the partition wall or side between the baking chamber and front port. In this manner, the passage seal of the baking tong passage openings is formed by the partition configuration itself, leading to a particularly simple layout.

The invention further provides in a wafer oven, in particular, one for flat wafers or low hollow wafers, that the sum of the areas of the openings in the front port, i.e., the openings through which air may enter the front port, amounts to at least 0.01 times, and preferably 0.1 to 0.3 times, the area of the wafer plate format, i.e., the area of the largest silouette of the wafer or wafer plate. The air inlet openings are thereby restricted to dimensions serving only the maintenance of a slight underpressure in the wafer oven.

The volume of gas (steam) to be removed from the front port also depends on the number of tongs of the wafer oven. That is, if an identical product is baked in two ovens of different size and if the same baking time is required, the amount of steam generated will depend on the number of tongs. In an automatic wafer baking machine having twice the number of tongs, twice the amount of batter must be processed. In order to effect this, a further aspect of the invention provides that the sum of the cross sectional areas of the air inlet openings, especially in the front port, corresponds at least to 0.01 times, and at most to 0.4 times, the product of the area of the wafer format (as defined above) and the number of baking tongs of the wafer oven. It is thereby assured that the air inlet orifices are not larger than absolutely necessary.

In a further embodiment of the invention, it is provided that the sum of the cross sectional areas of the air inlet openings, in particular in the front port, correspond at the maximum to 0.3 times the product of the area of the wafer format (as defined above) and the maximum number of baking tongs in the front port. This is particularly advantageous in the case of multiple part wafer molds.

It is further conveniently provided that the exhaust of the front port is connected preferably with a two-stage exhaustor, suctioning off 50 to 400 times the volume of the front port per hour. In this manner, the entire volume of steam generated in the front port may be exhausted.

Another characteristic of the invention resides in the fact that the exhaustor may be actuated by the opening of a door or the removal of a panel of the enclosure. This assures that the operator is protected against that steam present in the front port and the thermal radiation emitted by the baking tongs upon the opening of the door, for example, of the completely closed front port.

According to a further characteristic, it is provided that, with a two-stage exhaustor, the first or lower stage exhausts at least the steam generated by the pouring of the dough in the front port, and the second or higher stage, which preferably is actuated by the opening of a door of the enclosure in the area of the front port, removes an additional volume of air, thereby reducing the temperature in the front port to a level endurable by the operating personnel. By means of this arrangement, the steam generated in the front port is exhausted during the operation of the wafer oven, on the one hand, and the safety of the operating personnel is assured upon the opening of part of the enclosure, on the other hand. Part of the enclosure may be opened for maintenance, for example, and in that instance protection is accorded by the higher stage of the exhaustor which removes a substantially larger volume of air.

In a further embodiment of the invention, it is provided that a heat recovery installation, which preferably condenses the steam generated during the pouring of the dough, is connected to the exhaust of the front port, preferably in a bypass. It is advantageous that the heat leaving the front port through the exhaust, both with the steam and the baking gases exhausted, may be recovered. With the aid of the heat recovery installation, for example, hot water may be produced which may be available for the heating of creams or chocolate to be used for the coating of the wafers produced in the wafer oven.

In order to prevent tilting, especially in the case of flat wafers, during removal by the discharge spider, the invention provides that, laterally from the discharge spider or spiders, a guide or guides is located for each of the spiders, the guide revolving preferably in a synchronous manner with said spiders and limiting the path of the wafers. The guides are used for flat wafers or low, hollow wafers. The guides provide assurance that the flat wafers are located entirely within the discharge spider.

To be able to adjust the guides to different shapes of the wafers, the mutual axial distance between the guides is variable according to the invention.

Conveniently, two guides may be mounted on the shaft of the discharge spider, preferably in an adjustable manner. Alternatively, the two guides may be supported bearingly in the front port separately from the discharge spider and may be driven faster than the spider.

According to a further aspect of the invention, a directing device or upper guide is located above the outlet opening for the wafers to limit the path of the wafers in the upward direction. This achieves the advantage that the wafers are guided to the outlet opening, even when they are ejected very late from the open baking tongs.

Appropriately, the upper guide is designed as a guide surface projecting from the frontal wall of the enclosure and extending into the area above the discharge spider.

Further embodiments, characteristics and advantages of the present invention will become more apparent from the examples of embodiment hereinafter described, with the aid of the drawings attached hereto.

To reiterate and to restate certain of the foregoing in different terms, the invention relates to a wafer baking oven for making baked wafers from batter. The oven comprises a baking chamber defined by a thermally insulated baking chamber enclosure, the baking chamber having a front end and a rear end. There is a front port adjoining the baking chamber at the front end of the baking chamber. There are also a plurality of baking tongs in the baking enclosure, the baking tongs being movable through the baking chamber and into and out of the front port in a running direction. A batter pouring station and a discharge station are both located adjacent the front port. The discharge station has a discharge chute and at least one discharge spider. The batter pouring station cooperates with the baking tongs for filling the baking tongs with batter prior to movement of the baking tongs to the baking chamber. The discharge station receives from the baking tongs, via the discharge spiders, wafers which have been baked during movement of the baking tongs through the baking chamber and discharging, via the chute, the baked wafers which have been handled by the discharge spider. There is a housing enclosing the front port, the housing thereby also enclosing the discharge spider, part of the discharge chute, and at least part of the batter pouring station, the baking tongs being movable into and out of this housing. The housing includes a frame and a housing enclosure fastened to the frame. The housing has one side facing the baking chamber. The housing also has a pair of passage openings at the one side through which passage openings the baking tongs may pass. The housing also has an outlet opening through which the baked wafers discharged from the baking tongs may pass.

The aforementioned panel seal for the doors or panels forming the enclosure of the housing includes both a receiving portion and a ledge which protrudes into the receiving portion. The receiving portion may take the form of a C beam or a groove.

The aforementioned discharge spider is carried by a shaft having an axis and the aforementioned rotatable guides rotate about the axis of this shaft. The guides, in one embodiment, may include radial recesses for cooperation with closing rollers of the baking tongs. Each radial recess has a boundary, the boundary having a boundary portion located forwardly of the remainder of the boundary when considered with respect to the direction of rotation of the guide. This forwardly located boundary portion has a sliding surface arranged at an incline with respect to the axis about which the guide rotates.

Each baking tong is openable for discharging a baked wafer and for receiving a fresh charge of batter and closable for baking of the batter. Each baking tong has a baking side at which closing and opening of the baking tong is most pronounced. Each baking tong also has a closing roller for effecting closing thereof.

The aforementioned upper directing device for aiding discharge of baked wafers may comprise a pipe equipped with one or more compressed air outlets directed in the downward direction and arranged transversely to the direction of transport of the baked wafers.

BRIEF DESCRIPTION OF THE DRAWINGS

FIG. 1a shows a wafer baking oven according to the invention in side elevation;

FIG. 1b shows the same oven in a top view;

FIGS. 2a and 2b show a further form of embodiment of the invention in views similar to those of FIGS. 1a and 1b;

FIG. 3b is an end view of the front port shown in FIG. 3a;

FIG. 3c is a side elevation of the same front port from the side opposite to that shown in FIG. 3a;

FIGS. 5a, 5b and 5c show yet another form of embodiment of a front port in views corresponding to those of FIGS. 3a, 3b and 3c;

FIGS. 8, 9 and 10a show various wafer sheet discharge arrangements, each in a top view;

FIG. 10b shows a variant form of an upper directing device for a discharge station according to the invention;

FIG. 11 is a cross section on the line A—A of FIG. 2a through a wafer baking oven according to the invention;

FIG. 13a shows a further form of embodiment of the wafer oven of the invention in a side elevation;

FIG. 13b is a top view of FIG. 13a;

FIG. 14 is a cross section on the line B—B of FIG. 2a;

FIG. 15 includes details of FIG. 14 at an enlarged scale;

FIG. 17 is a cross section on the line C—C and a cross section on the line D—D of FIG. 2b;

FIG. 18 shows a section on the line E—E of FIG. 2a;

FIG. 19 shows a section on the line F—F of FIG. 2a;

FIG. 20a shows a door of the enclosure of the front port in a view from the inside;

FIG. 20b shows a top view of FIG. 20a; and

FIG. 21 is a fragmentary detailed view in section showing a part of the enclosure with bolting.

DETAILED DESCRIPTION

Figure 3A:
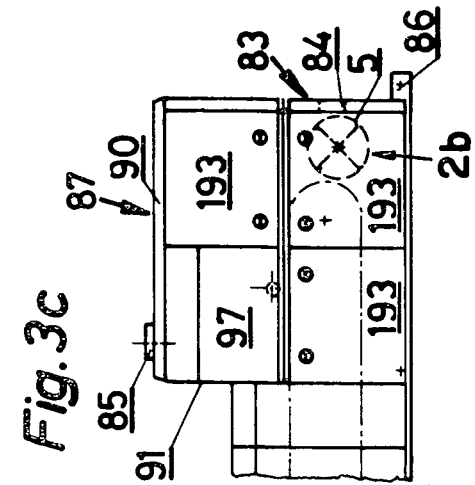
FIG. 3a shows, in side elevation, another form of embodiment of a front port of a wafer oven according to the invention.

The invention shall be described hereinafter by way of example through reference to a wafer oven with revolving baking tongs, wherein the baking tongs are arranged to form an endless chain of baking tongs and wherein the wafer baking molds arranged in the baking tongs are laid out for the production of flat wafers or low, hollow wafers. Such molds are essentially flat baking sheets, with the exception of the pattern for wafer sheets and the recesses for low, hollow wafers on the batter treating side. Obviously, the forms of embodiment, characteristics and advantages described hereinbelow may also be applied to other wafer baking ovens within the scope of the present invention. Thus, for example, the individual baking tongs are not necessarily connected with each other to form a chain of tongs revolving in a pair of vertical planes. They may be guided through the wafer oven in some other manner.

Furthermore, the wafer baking molds arranged in the baking tongs may be designed in the shape of multiple part baking inserts for the production of wafer cones or wafer cups. Also, the wafer molds in the form of wafer baking sheets may be equipped with steam sealing edges or ledges to promote full baking. In addition, the number of baking tongs revolving in a wafer oven may be arbitrarily chosen. Thus, for example, wafer ovens with only 12 baking tongs and ovens with 80 or more tongs may be provided in keeping with the forms of embodiment and characteristics described hereinafter.

A wafer baking oven 1 has at its front end 1a a front port 2 encompassing a charging or batter pouring station 2a and a discharge station 2b, together with a baking chamber 3, connected with the front port 2 and equipped with an enclosure. Inside the wafer oven 1 the baking tongs 4 combined in an endless chain and with the baking molds arranged 400 (FIG. 6) in them, move along an elongated revolving route inside the wafer oven. The baking tongs 4, and the wafer baking molds with them, are opened upon their passage through the front port 2 for the removal of the wafers and the subsequent insertion of the dough, are closed after the pouring of the dough, and are guided in the closed state through the baking chamber 3 (see FIGS. 5c, 6 and 7). At the discharge station 2b, the individual wafers are taken by a discharge device 5 from the open baking tongs and discharged from the wafer oven. The batter is then inserted when the tongs 4 are open, by means of a batter pouring station 6, at least a part of which protrudes into the open wafer molds of the baking tongs.

According to a first form of embodiment of the invention (with variations according to FIGS. 1a, 1b, 2a, 2b, 3a, 3b and 3c), the front port 80 is enclosed in a housing 81. It may be equipped with thermal insulation 82. The front port 80 is joined with the baking chamber 3 at the front end 1a of the latter. Front port 80 is surrounded in this form of embodiment by the housing 81 in an essentially complete manner. This front port is essentially completely enclosed and thermally insulated on all sides in the wafer oven according to the invention. The front port has only an outlet opening 84 in its front wall 83 for the wafers (see FIG. 3), together with one or more exhaust openings 85 for the baking gases. If a cleaning device is built into the wafer oven for baking wastes, a discharge opening 86 for said wastes is added (see FIGS. 3a, 3b and 3c).

The wafer oven according to the invention may be equipped with a housing sealed in a gas tight manner, thermally insulated and having only the above-mentioned openings, througn which the supply lines (for the batter, power or gas, always for the secondary air for the burners and possibly for compressed air for the discharge of wafers and the cleaning of baking molds) are introduced in a gas tight manner.

Figure 3B:
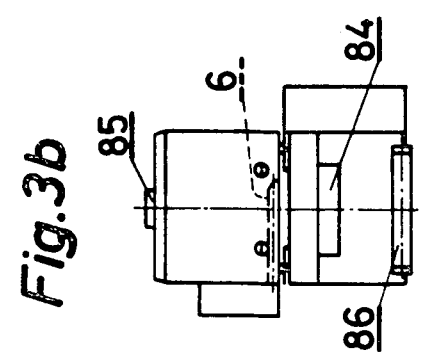
Figure 3C:
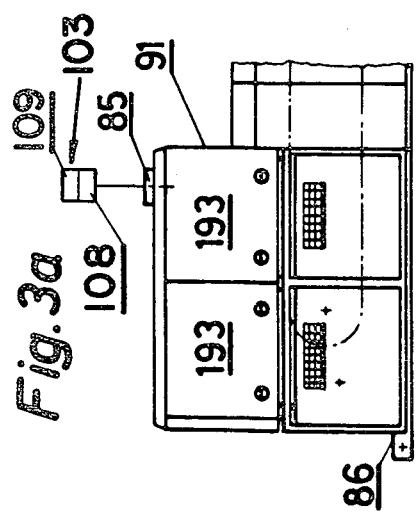

According to the embodiment of FIGS. 3a, 3b and 3c, the front port, which in this instance is designated by reference character 87, is essentially completely closed, with the exception of a preferably self-closing discharge opening 84 for the wafers and an exhaust opening. The exhaust opening 85 is arranged in the cover 90 of the front port housing or in the upper area of the rear wall 91 of the front port 87 (FIGS. 3a, 3b and 3c).

Figure 4A:
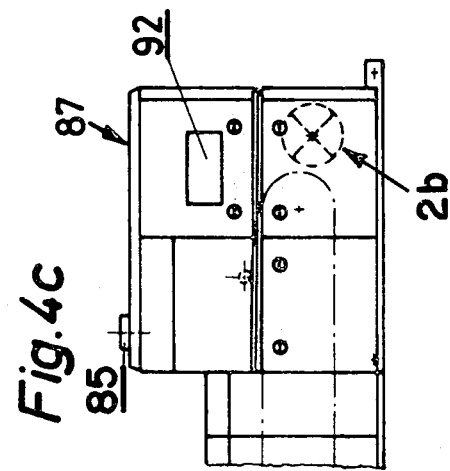
FIGS. 4a, 4b and 4c show a further form of embodiment of a front port in views corresponding to those of FIGS. 3a, 3b and 3c.
Figure 4B:
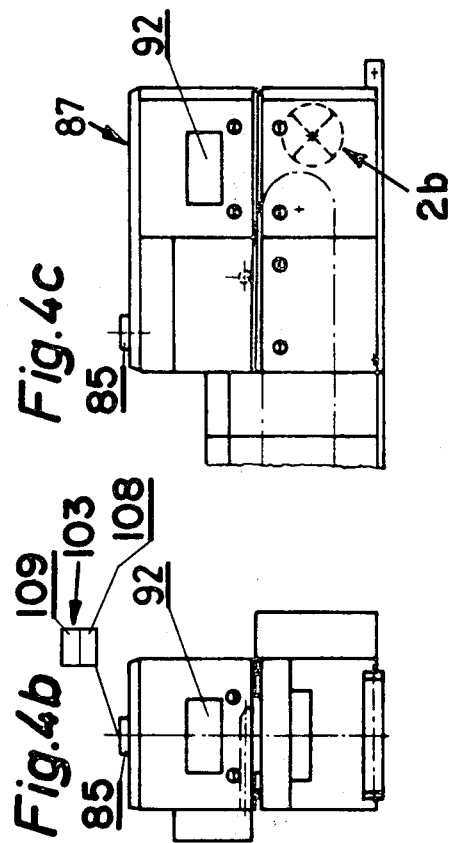
Figure 4C:
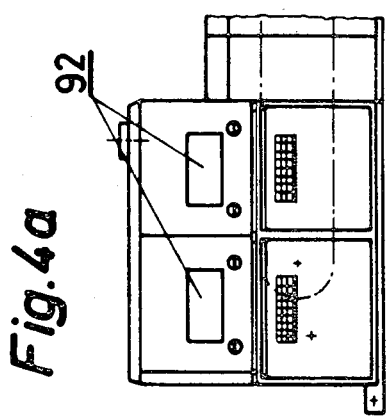

In another form of embodiment of the invention, a plurality of observation or maintenance openings 92 are provided in individual parts of the enclosure of the upper part of the front port, making possible the observation of processes in the front port of the wafer oven (FIGS. 4a, 4b and 4c).

According to a further form of embodiment of the invention, the upper part of the housing of a front port designated by reference character 93 is open on one side, preferably on the side on which the batter pouring station 6 is arranged (FIGS. 5a, 5b and 5c).

The size of the openings through which air may be suctioned into the front port 80, 87, 93 or into the entire wafer oven, is restricted to certain limits, depending on the form of embodiment of the front port 80, 87, 93. Thus, for example, the sum of the cross sectional areas of all of the air intake openings (i.e., openings through which air may enter the front port during the operation of the baking oven), specifically the discharge and outlet openings 84 and 86, and the unsealed gaps between parts of the enclosure is, in the case of a wafer oven equipped with wafer baking sheets, equal at least to 0.01 to 0.3 times the formation area of the wafer sheet, with the range of 0.1 to 0.3 times the formation area of the wafer sheet being preferred (see the definition of "format, size or area" which follows).

The upper limit for the sum of the areas of cross sections of all of the air inlet openings is 0.03 to 1 times, preferably 0.3 times, the product of the area of the wafer sheet and the maximum number of baking tongs in the front port 80, 87, 93. Related to the entire wafer oven, this sum of cross sections is between 0.01 to 0.4 times the product of the wafer size and the number of baking tongs in the wafer oven.

The area format or size of the wafer is defined as the area of the perpendicular projection of a flat wafer or low, hollow wafer onto a flat substrate, upon which the wafer rests. In other words, the area format or size of the wafer is the area of the wafer's largest silouette.

In each of the above forms of embodiment of the front port 80, 87, 93, an exhaustor (schematically shown by reference characters 100 and 101) may be connected with the exhaust 85. The exhaustor 103, 103a suctions off the steam generated in the front port 80, 87, 93 during the pouring and the closing of the wafer molds. The volume exhausted per hour corresponds to 50 to 400 times the volume of the front port. The volume actually exhausted per hour is determined by the volume of steam generated and by whether it is merely the escape of steam from the front port 80, 87, 93 that is to be prevented or whether it should also be possible for the operating personnel to work within the front port 80, 87, 93. In order to effect both functions, the exhaustor 101 may include two stages 108, 109.

Several variants are provided for the configuration of the front port exhaust and an exhaustor possibly connected with it.

Thus, for example, if all of the steam generated during the operation of the wafer oven is exhausted through the baking chamber, the exhaustor 103 may have a single stage and may be laid out for an hourly exhaust volume. This reduces the temperature in the front port 80, 87, 93 to a degree, in spite of the radiating heat emitted by the baking tongs and wafer molds, allowing the operating personnel to work within the front port 80, 87, 93.

The single stage exhaustor 103a is actuated prior to access to the front port 80, 87, 93 by the person involved. In the closed state of the front port 87, the exhaustor 103a is actuated simultaneously with the opening of a door or the removal of a part of the enclosure, wherein the exhaustor conveniently attains its full capacity by the complete opening or removal of the door or the part.

If the volume of steam generated in the front port 80, 87, 93 is exhausted in the front port itself, a two-stage exhaustor 103 is connected with the exhaust 85 of the front port, whereby the first or lower stage 108 exhausts at least the steam generated during the pouring of the batter in the front port 80, 87, 93 and the second or higher stage 109 exhausts the additional air reducing the temperature in the open front port 80, 87, 93 to a degree acceptable to the operating personnel.

In the case of a closed port 87, the higher stage 109 of the exhaustor is actuated, for example, by the opening of a door in the enclosure 81 in the area of the front port 80, 87. Naturally, this may also be effected by the operator himself, for example, from the control panel of the wafer oven. In the process, the lower stage 108 of the exhaustor moves 50 to 100 times the volume of the front port and the higher stage 20 to 400 times the volume of the front port per hour.

A heat recovery installation 210 may further be connected with the exhaust of the front port via a bypass 219. This installation may, for example, preheat the compressed air used in the front port, thereby reducing both the compressor capacity required and the heating capacity. The heat recovery installation 210 may also be used for the production of hot water for machines which process or prepare creams or chocolate and which follow the automatic wafer baking machine in sequence. It is particularly advantageous to condense the steam exhausted from the front port as completely as possible.

In each of the abovedescribed forms of embodiment of a wafer oven according to the invention, there is within the enclosure 81 of the front port 80, 87, 93, at least one multi-arm discharge spider 5, 110, preferably driven synchronously with the revolving baking tongs and rotating in a vertical plane.

Figure 6:
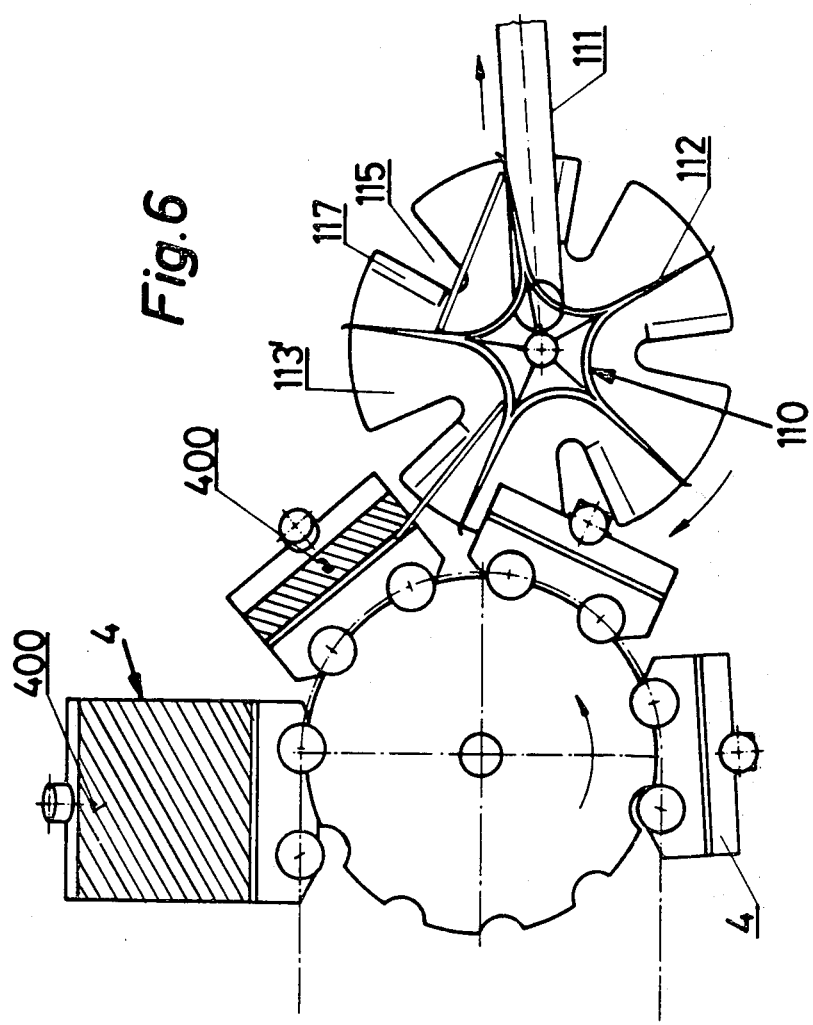
FIGS. 6 and 7 each show, in side elevation, a different embodiment of a wafer sheet discharge station.
Figure 7:
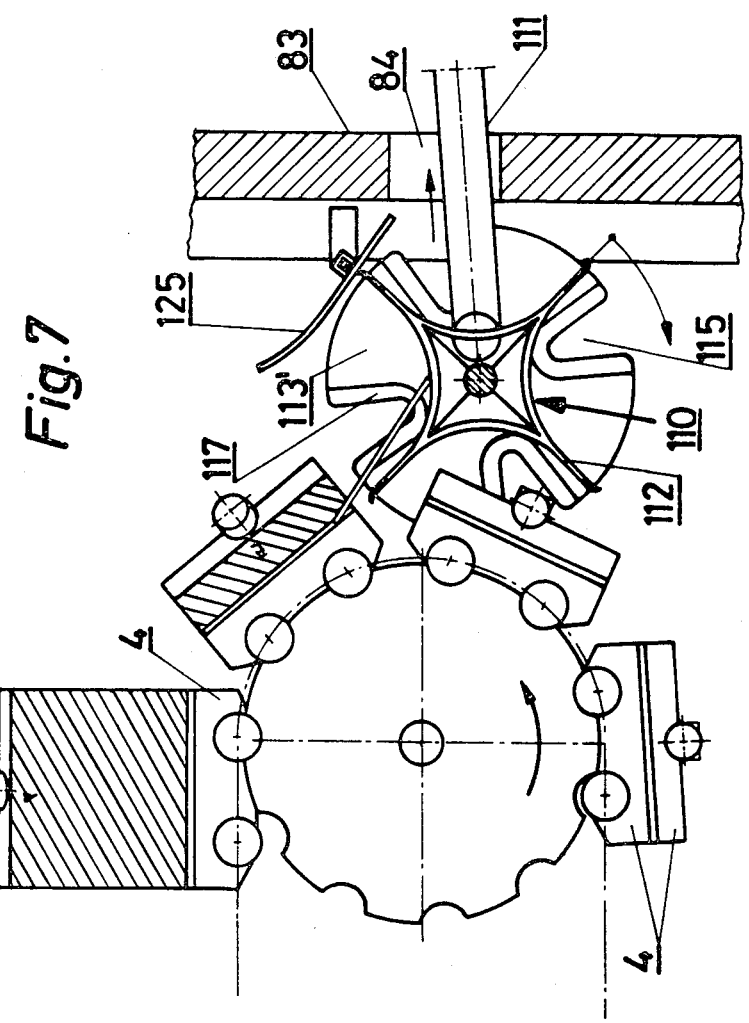

The spider may have a configuration so that a wafer sheet sliding between the arms of the spider will be turned around by the movement of the spider and thereby transferred to a conveyor belt 111 leading out of the wafer oven (FIGS. 6 and 7).

According to a variant of the invention, the discharge spider 110 may be a sliding spider wherein the wafer sheet slides along the arms 112 of said spider, with the same side of said wafer sheet always remaining on top. The discharge or sliding spider 110 may have four or five or more arms 112.

In order to guide the flat wafers or low, hollow wafers safely in the sliding spider 110, according to the further embodiment of the invention, laterally to the discharge spider 110, a revolving guide 113, 113', each limiting the path of the wafers, is provided. The guides 113, 113' are arranged coaxially with respect to the discharge 110 and may be mounted on the shaft 114 of the discharge spider, whereupon they will revolve synchronously with the spider 110. Alternatively, the guides 113, 113' may be supported bearingly in the front port 80, 87, 93 separately on the shaft of the spider 110, whereby they may revolve slightly faster or slower than the spider 110. In order to facilitate the adjustment of the wafer oven from one size of wafers to another, the mutual distance between the two guides 113, 113' is variable. Adjustments may be made by the shifting and reclamping of the guides 113, 113' on the shaft 114 of the spider 110 or by axial sliding of the bearings of the guides 113, 113' on the shaft of the spider. To insure the safe operating of the guides 113, 113', the mutual distance between the guides 113, 113' must amount to at least 1.005 to 1.02 times the width of the wafer format measured transversely to the running direction of the baking tong and may amount at the most to 1.005 to 1.3 times the diagonal length of a wafer format.

In order to be able to arrange the discharge spider 110, together with the guides 113, 113', as close as possible to the chain of baking tongs, at least the guide 113 arranged at the closure side of the baking tong has radial recesses 115 for parts of the upper part of the tong, in particular for the closure rollers 104 of the tongs, which rollers 104 are used in effecting closing of the tongs.

The rotating guides 113, 113' may have the configuration of a dinner plate according to one form of embodiment of the invention and may face each other with their convex sides (FIG. 10).

According to a variant, the guides 113, 113' are disks with a diameter equal to 0.5 to 1.5 times, preferably 0.9 to 1.1 times, the diameter of the track upon which the ends of the arms 112 of the spider 110 are resting.

Figure 8:
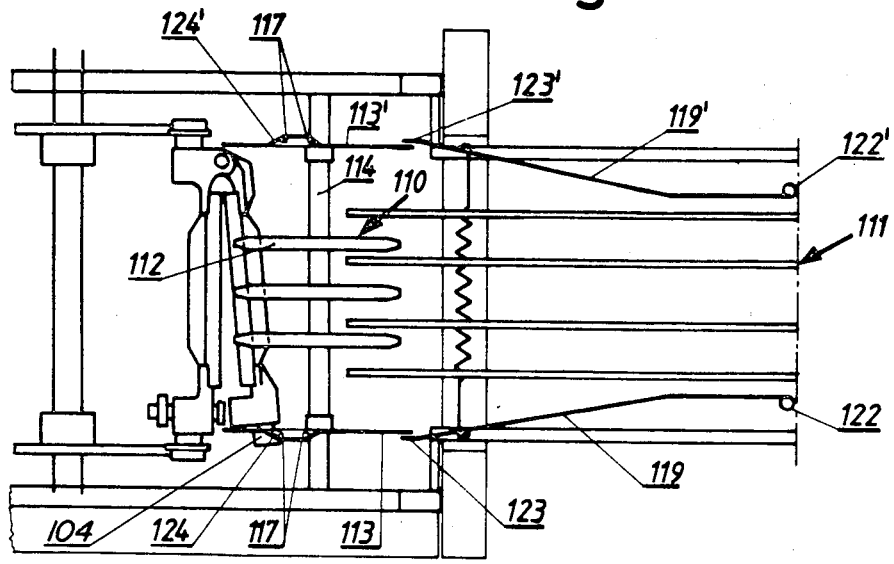
Figure 9:
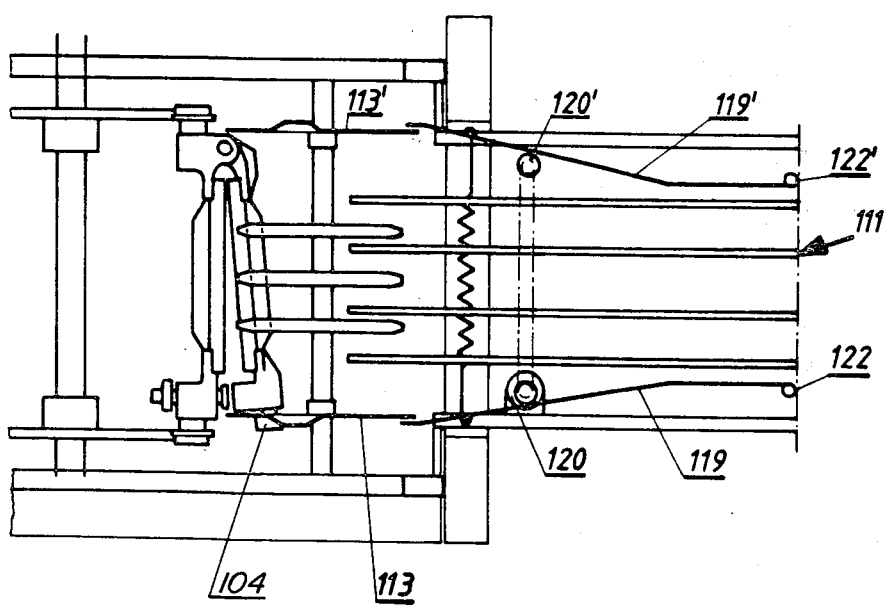
Figure 14:
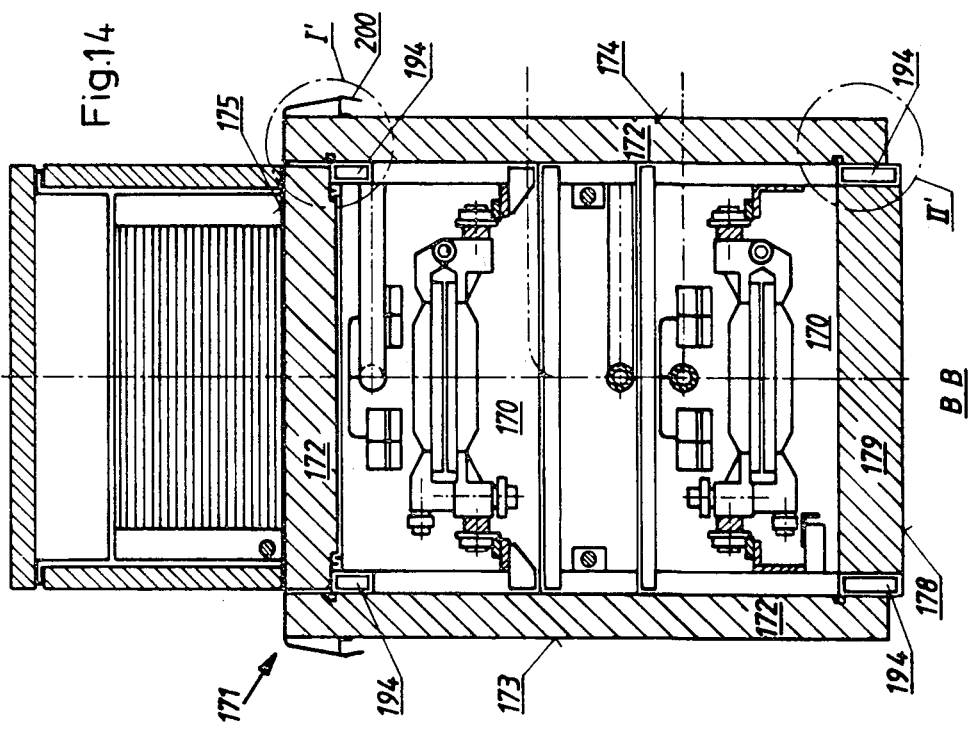

To prevent sticking of the flat wafers in the radial recesses 115 of the guides 113, 113', the boundaries of the radial recess 115 may be provided, at least in part, with a sliding surface 117 arranged obliquely, i.e., at an incline, to the rotating axis of the guide 113, 113'. Sliding surface 117 may extend from the outside of the inside of the guide. In order to prevent the sticking of flat wafers in the discharge spider 110 between the rotating guides 113, 113' or following the spider 110, and to turn flat wafers that emerge laterally offset into a symmetrical disposition with respect to the longitudinal axis of the chain of baking tongs, two lateral directing devices or guides 119, 119' are provided. The lateral directing devices 119, 119' are disposed downstream of the rotating guides 113, 113' and arranged above a chute or conveyor installation 111 transporting the wafers from the wafer oven. The lateral directing devices pivot around vertical axes and extend in part obliquely to, i.e., laterally inclined with respect to, the longitudinal center axis 105 of the baking oven on the lateral sides thereof. The may be pivoted in a certain back and forth rhythm (FIGS. 8 and 9). This rhythm effected by virtue of the engagement of the two lateral guides 119, 119' against rotating eccentrics 120, 120' (FIG. 9). The eccentric axes are located, as viewed in the transport direction, between the discharge spider and the pivoting axes of the two lateral guides. The latter are held against the eccentric by a tension spring 121.

According to a further form of embodiment, the lateral guides 119, 119 have ends 123, 123' opposite to their pivoting axes 122, 122'. These ends abut against the rotating guides 113, 113' from the outside, the latter being equipped on their outward facing sides with projections distributed over their circumference 124 (FIG. 8). To be able to guide the wafers to the outlet opening 84, even when they are ejected very late from the opened baking tongs and when they are therefore sliding over the spider 110, an upper directing device or guide 125 (FIG. 7) is provided in the front port 80, 87, 93 above the outlet opening 84 for the wafers, upper directing device 125 limits the path of the wafers in the upward direction and guides the wafers to the outlet opening 84. The upper directing device 125 has the configuration of a guiding surface projecting from the front wall of the housing or enclosure and extending into the area above the discharge spider. This guiding surface may consist of a metal plate or of several rods.

According to another aspect of the invention, a bulkhead-like partition 95 is provided between the front port 80, 87, 93 and the baking chamber 3, 170 of a wafer oven according to the invention. Partition 95 is equipped with two passage openings 94 for the baking tongs with the wafer molds, wherein one upper passage opening 94 cooperates with the baking tongs of the upper track of the baking tongs or the upper loop of the chain of baking tongs, while the other lower passage opening 94' is associated with the lower track of the baking tongs of the lower loop of the chain of baking tongs (see FIGS. 11 to 13b and, in particular, FIGS. 11, 12a, 12b and 12c).

One form of embodiment of the invention provides that the two passage openings 94, 94' for the baking tongs are arranged in their own sections 96, 96' of the partition 95, with the section 96 containing the upper passage opening 94 of the partition 95 and being arranged in a manner offset to the rear with respect to the section 96' containing the lower passage opening 94', whereby the steam generated immediately following the closing of the baking tongs, and thus within the wafer molds, is prevented from escaping into the baking chamber 170 (FIG. 13a).

Figure 12A:
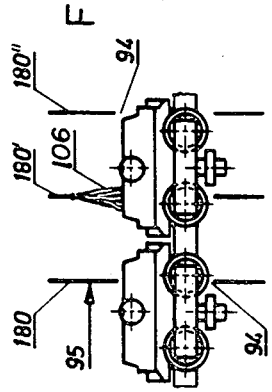
FIGS. 12a, 12b and 12c show in cross section three different configurations of a passage opening for baking tongs.
Figure 12B:
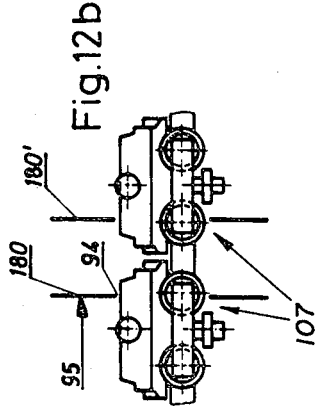

The partition 95 may, according to the invention, consist of a single bulkhead wall. There may, however, be two bulkhead walls 180, 180' (FIG. 12b) of three bulkhead walls 180, 180', 180" (FIG. 12a).

The passage openings for the baking tongs have outlines essentially corresponding to the outline of the cross section of a baking tong taken perpendicularly to its running direction. The tong cross section perpendicular to the running direction is defined as the cross section of all parts moving along the track with the tong, i.e., the cross sections of the wafer molds, of the tong itself, and of the conveyor installation for the tongs, for example, a conveyor chain (FIG. 11).

The cross section of the passage opening for the baking tongs may be at least substantially equal in area to the tong cross section perpendicular to the running direction. For the purpose of sealing the interval between two successive baking tongs, the passage opening may be covered, for example, by a glass fiber curtain (FIG. 12a).

Conveniently, the cross section of the passage opening for the baking tongs may be larger than the cross sectional area of the baking tongs taken in a direction perpendicular to their running direction by 1% to 25%, and preferably 5%.

Figure 12C:
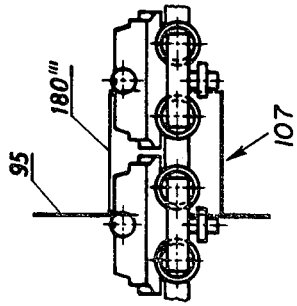

This insures that, on the one hand, no exhaust gases may penetrate from the baking chamber into the front port and, on the other hand, that the exhaustor for the baking chamber will exhaust from the front port only the volume of air required for the removal of the steam generated therein. To prevent flow of baking gases through the partition, passage seals, generally referred to by reference character 106, are provided in the passage openings for the baking tongs. These may consist of glass fiber curtains 107, or bristles, or the like, fastened to the partition between the front port and the baking chamber, or of a labyrinth formed by several bulkhead plates 180, 180', 180", of the partition itself, with the distance between two bulkhead plates being equal to at least the distance between two successive baking tongs. According to a further variant, the seal may be formed by a channel 180''' corresponding in its cross sectional shape and area to the cross sectional shape and area of the tongs perpendicular to their running direction, with the length of said channel being at least equal to the distance between two successive tongs (FIG. 12c).

According to a further aspect of the invention, the housing of the wafer oven in the area of the front port is formed by an enclosure of panels 192 or doors 193 joined together and fastened to a supporting oven frame 194. The panels 192 or doors 193 may be sealed at their joints against each other, or against the oven frame, or only against each other (FIGS. 2a, 2b and 14–19).

The enclosure 81 in the area of the front port 80, 87, 93 may have at least one door 97, which in the closed state is sealed against the oven frame and which carries a batter pouring station 6 (FIGS. 1a, 1b, 20a and 20b). To be able to remove the batter pouring station 6, for example, for cleaning, from the front port, the door may be pivoted upwards into a position approximately perpendicular to the running direction of the baking tongs, or it may be brought into a position parallel to the running direction of the baking tongs. The door 97 carrying the batter pouring station 6 is, according to a specific exemplary embodiment, supported on two arms 99, rotatably mounted on the oven frame 194 by means of two arms 98, 98'. Arms 98, 98' are pivotally supported on the inside of the door. The two arms 98, 98' are also conveniently connected with each other by a C-shaped strap 100, rotatable around a vertical axis. The strap 100 is pivotally supported with the arms 98, 98' in the area of the vertical center axis of the door on the inside of the door, while the two pivoting arms 99, also joined with each other, are supported rotatably on the oven frame 194, in the area of one of the lateral edges of the door around a common, vertical axis. To better control the door 97 during opening and to protect the pourer 6 against damage, according to a further aspect of the invention a guide strip 101, protruding from the door, is provided on the inside of the door 97. The guide strip 101 cooperating with guide rails 102 is fastened on the oven frame 194 or on the cover 90 of the front port. This enables one to pull the batter pourer, together with the door 97, transversely to the running direction of the baking tongs from the front port without twisting the door as long as the pourer is within the front port. The guide strip 101 consists of a shaped ledge protruding from the upper edge of the door 97, said shaped ledge being straight and in cooperation with a straight guide rail 102 in the front port (FIGS. 20a and 20b).

A further aspect of the invention provides that in the case of an enclosure formed of panels and doors 81, the individual doors and panels may be sealed against the oven frame 194. In the case of the doors, their upper and lower edges and, in the case of panels, their lateral edges which extend in the longitudinal direction of the oven are sealed against the longitudinal beams of the oven frame 194. At the same time, the vertical door edges and the edges of the panels extending transversely to the longitudinal direction of the oven are sealed against transverse beams connecting the longitudinal beams of the oven frame with each other (FIGS. 15–19). According to a variant of the invention, the doors and/or the panels of the enclosure may be bolted from the inside of the baking chamber 3, in the closed or the assembled state (FIG. 21). In order to open the enclosure of the entire wafer oven in the case of a completely closed front port, at least one door, preferably in the area of the front port, is provided with bolts that may be remotely controlled by a remote control operator (schematically shown at 305 in FIG. 21), for example, by electrical or pneumatic means. In the case of any cleaning or maintenance work, the enclosure may be unbolted and opened or removed, panel by panel and door by door, beginning with the abovementioned door in the front panel. Conveniently, the door in the area of the front port carrying the batter pouring station may, as indicated, be bolted and unbolted by remote control. Naturally, the entire enclosure of the front port may also be bolted by remote control or not locked at all, in which case the baking chamber itself or its parts are equipped with internal bolting devices.

The internal, remotely controlled bolting 300 may be formed according to the invention by a shaft 301, supported for inward rotation on each longitudinal side of the baking chamber on the oven frame 194. Shaft 301 extends along all of the doors 193 belonging to each side wall, with an upwardly pointing hook 302 being arranged on each door 193. When the doors are bolted, the hooks 302 are engaged from above by hooks 303 fastened to the shaft 301. By means of this configuration, the side wall involved or its doors 193 may be unlocked by a simple rotation of the shaft 301. The rotation of the shaft 301 may be effected electrically or pneumatically (FIG. 21).

Figure 16:
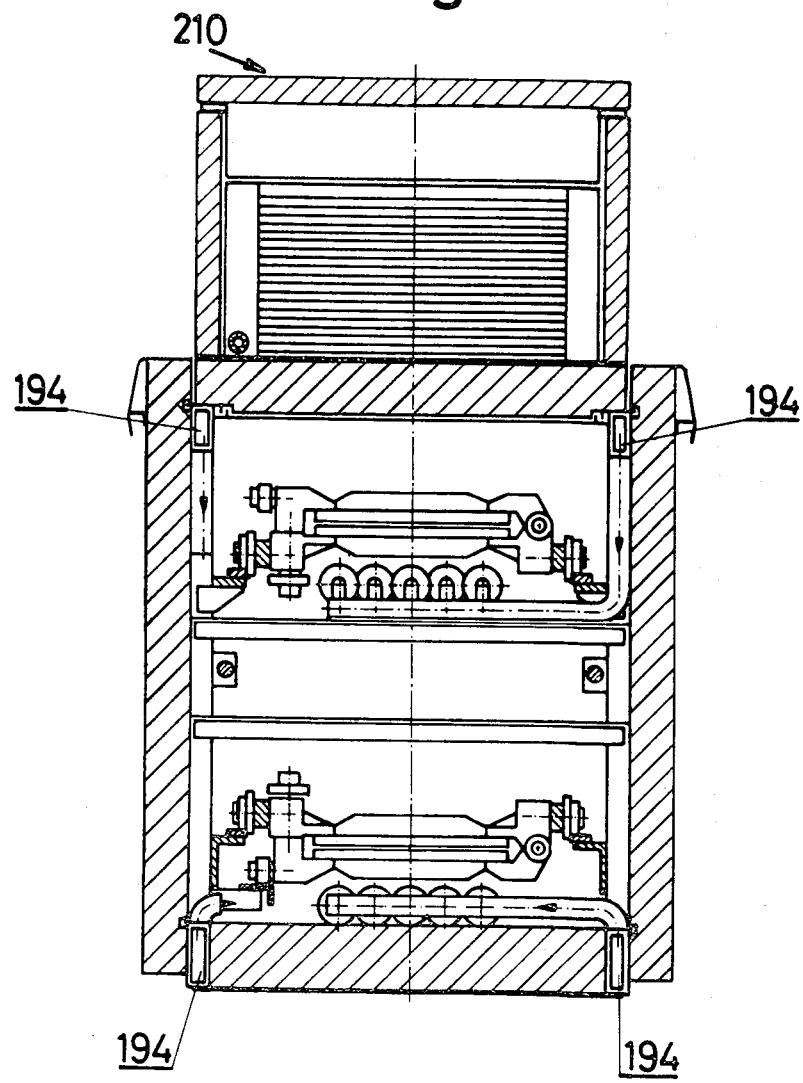
FIG. 16 is a view similar to FIG. 4 of a further embodiment of the wafer baking oven according to the present invention.
Figure 19:
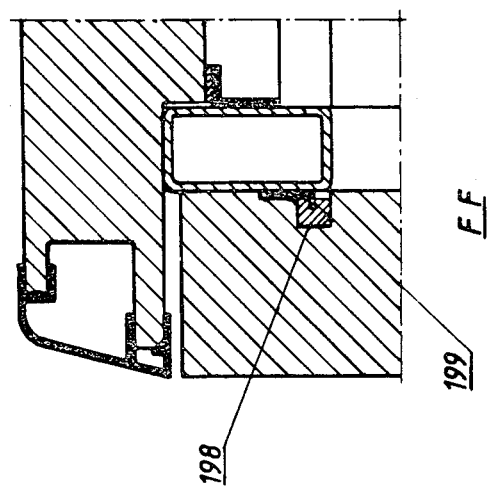
Figure 18:
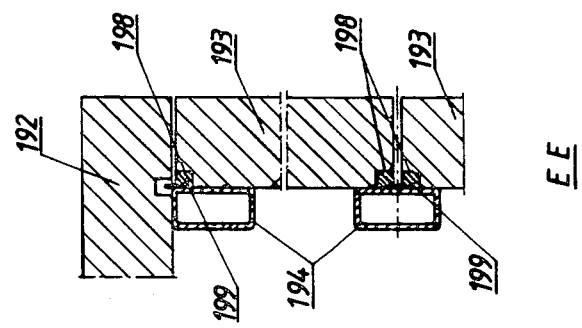

The sealing of the panels 192 or doors 193 forming the enclosure 81 against the longitudinal or transverse beams in their edge areas of the oven frame (which frame consists of profiled tubes) is effected by panel seals including a ledge 199 extending into a C beam 197 or a groove 198. The inside of the C beam 197 or the groove 198 is filled with a heat-resistant sealing material. The ledge 199 engages, rests against or protrudes into the sealing material in the case of closed doors 193 or inserted panels 192 (FIG. 15). In the case of the panels forming the ceiling wall 175, the C beam involved is mounted on the longitudinal capping pieces of the oven frame and with the opening is on top. In this instance, the ledges 199 consist in an edging bead of an L angle shape inserted in the panel. In the case of the edges of the panels 192 arranged transversely to the longitudinal direction of the oven, the seal between two adjacent panels is formed by a single C beam (FIG. 17). In the case of doors forming the lateral walls of the enclosure, a groove 198 is provided in the edge of the door, which again is filled with a heat-resistant sealing material and into which protrudes a ledge 199 extending from the oven frame. The grips 200 provided for the opening of the door 193 are fastened to the outside of the doors. Thus, in the case of the leaking of a seal, for example, as a result of damage, the hot baking gases exit in the area of the blunt abutment between the ceiling wall and the door, in the upward direction, without heating the grip 200 (FIGS. 15 and 16).

An alternative to the types of upper directing devices 125 described above is shown in FIG. 10a. There, the upper directing device comprises a pipe 125a for receiving compressed air. Pipe 125a has a plurality of compressed air outlets 125b directed downwardly and arranged transversely to the direction of the wafer transport to guide the wafers discharged by the discharge spider 110.

It is self-evident that any combination of all of the forms of embodiment of the invention described hereinabove and the combination of these forms of embodiment and all variants obvious to persons skilled in the art are within the scope of the invention.

What is claimed is:

1. A wafer baking oven for making, from batter, baked wafers such as flat wafers, low hollow wafers, sugar cones, wafer cups, wafer figures and the like, the baking oven comprising:
   a baking chamber defined by a thermally insulated baking chamber enclosure, the baking chamber having a front end and a rear end;
   a front port adjoining the baking chamber at the front end of the baking chamber;
   a plurality of baking tongs in the baking enclosure, the baking tongs being movable through the baking chamber and into and out of the front port in a running direction;
   a batter pouring station and a discharge station, both located adjacent the front port, the discharge station having a discharge chute and at least one discharge spider, the batter pouring station cooperating with the baking tongs for filling the baking tongs with batter prior to movement of the baking tongs through the baking chamber, the discharge station receiving from said baking tongs, via the discharge spiders, wafers which have been baked during movement of the baking tongs through the baking chamber and discharging, via the chute, the baked wafers which have been handled by the discharge spider;
   a housing enclosing the front port, the housing thereby also enclosing the discharge spider, part of the discharge chute and at least part of the batter filling station, the baking tongs being movable into and out of the housing;
   the housing including a frame and a housing enclosure fastened to the frame, the housing having one side facing the baking chamber;
   the housing having a pair of passage openings at said one side through which passage openings the baking tongs may pass;
   the housing also having an outlet opening through which the baked wafers discharged from the baking tongs may pass.

2. Wafer baking oven according to claim 1, wherein the housing is substantially completely enclosed with the exception of the outlet opening for the baked wafers and the passage openings for the baking tongs.

3. Wafer baking oven according to claim 2, wherein the housing includes at least one discharge opening for baking wastes, the housing being substantially completely enclosed with the exception of the outlet opening for the baked wafers, the passage openings for the baking tongs and the discharge opening for baking wastes.

4. Wafer baking oven according to claim 1, wherein the enclosure of the housing has a pair of lateral walls running normal to said one side of said housing, the housing having a door arranged in one of the lateral walls, the door being pivotable into an open position approximately perpendicular to the running direction of the baking tongs and movable as well into a closed position parallel to the running direction of the baking tongs and carrying a dough pouring installation.

5. Wafer baking oven according to claim 1, wherein the enclosure forming the housing consists at least in part of individual panels fastened removably to a frame and abutting against each other.

6. Wafer baking oven according to claim 5, wherein the panels have edges, the panels being sealed in the area of their edges against each other.

7. Wafer baking oven according to claim 1 or 6, wherein the panels are sealed in the area of their edges against the frame of the housing.

8. Wafer baking oven according to claim 1, wherein the panels have panel seals therebetween, which panel seals have the configuration of a labyrinth.

9. Wafer baking oven according to claim 8, wherein each panel seal is formed by a ledge and receiving portion, the ledge protruding into the receiving portion.

10. Wafer baking oven according to claim 8, wherein at least one of the panels constitutes a door.

11. Wafer baking oven according to claim 9, wherein the receiving portion includes a C beam.

12. Wafer baking oven according to claim 9, wherein the receiving portion includes a groove.

13. Wafer baking oven according to claim 9, including a heat resistant gasket material arranged inside the receiving portion of the panel, the ledge engaging the gasket material.

14. Wafer baking oven according to claim 9, wherein the housing has a ceiling wall which joins the lateral walls, the ceiling wall and the lateral walls being composed, at least in part, of the panels and wherein, in the panels of the lateral walls, the receiving portions are formed on the panel and the ledge is formed on the frame while, in the area of the ceiling wall of the housing, the receiving portions are provided on the frame and the ledge is provided on the panel.

15. Wafer baking oven according to claim 9, wherein the housing has an inside and wherein the panels of the enclosure are bolted from the inside of the housing in a closed state, and including a remote control operator for the bolting of at least part of the panels.

16. Wafer baking oven according to claim 1, including an upper track and lower track in the baking chamber for guiding the baking tongs in their movement and wherein said one side of the housing facing the baking chamber has two sections, each section being equipped with one of the passage openings for the baking tongs, each passage opening cooperating with one or the other of the tracks, the section equipped with the passage opening cooperating with the upper track of the baking tongs being off-set to the rear with respect to the section equipped with the passage opening cooperating with the lower track of the baking tongs.

17. Wafer baking oven according to claim 16, wherein the passage openings for the baking tongs each have an outline corresponding essentially to an outline of the cross section of a baking tong taken perpendicular to its running direction.

18. Wafer baking oven according to claim 17, wherein each passage opening for the baking tongs is at least equal in area to the cross sectional area of the baking tong perpendicular to the running direction of the baking tong.

19. Wafer baking oven according to claim 17, wherein the cross sectional area of the passage opening for the baking tongs is larger by 1% to 25% than the cross sectional area of the baking tong perpendicular to the running direction.

20. Wafer baking oven according to claim 17, wherein the cross sectional area of the passage opening for the baking tongs is larger by 5% than the cross sectional area of the baking tong perpendicular to the running direction.

21. Wafer baking oven according to claim 17, including a passage seal provided in the passage openings for the baking tongs.

22. Wafer baking oven according to claim 21, wherein said passage seal for the passage openings for the baking tongs is in the form of glass fiber elements.

23. Wafer baking oven according to claim 21, wherein said passage seal is a labyrinth seal.

24. Wafer baking oven according to claim 23, wherein the labyrinth passage seal is formed by a plurality of vertical bulkhead plates constituting at least a part of said one side of the housing.

25. Wafer baking oven according to claim 24, wherein two of said bulkhead plates are spaced apart a distance at least equal to the distance between two successive baking tongs.

26. Wafer baking oven according to claim 21, wherein the passage seal is formed by a channel having a passageway corresponding in size and shape in its cross section to the cross section of the baking tongs, both the cross section of the channel and that of the baking tongs being taken perpendicular to the running direction and the channel having a length in the running direction of the baking tongs at least equal to the distance between two successive baking tongs.

27. Wafer baking oven according to claim 1, wherein the enclosure of the housing includes walls equipped with thermal insulation.

28. Wafer baking oven according to claim 2 or 3, wherein the sum of the areas of the openings in the housing is at least 0.01 times the area of the largest silouette of the baked wafer, in instances where the baked wafer is a flat wafer or low hollow wafer.

29. Wafer baking oven according to claim 2 or 3, wherein the sum of the areas of the openings in the housing is at least 0.1 to 0.3 times the area of the largest silouette of the baked wafer, in instances where the baked wafer is a flat wafer or low hollow wafer.

30. Wafer baking oven according to claim 1, wherein the front port may contain a certain maximum number of baking tongs at any one time and wherein the sum of the areas of the openings in the housing is at least 0.03 to 1 times the product area of the largest silouette of the wafer and the maximum number of baking tongs in the front port in instances where the baked wafer is a flat wafer or low hollow wafer.

31. Wafer baking oven according to claim 1, wherein the front port may contain a certain maximum number of baking tongs at any one time and wherein the sum of the areas of the openings in the housing is at least 0.3 times the product area of the largest silouette of the wafer and the maximum number of baking tongs in the front port in instances where the baked wafer is a flat wafer or low hollow wafer.

32. Wafer baking oven according to claim 1, wherein the sum of the areas of the openings in the front port corresponds at least to 0.05 times and at most to 0.4 times the product of the area of the largest silouette of the wafer and the number of baking tongs of the wafer oven where the baked wafer is a flat wafer or low hollow wafer.

33. Wafer baking oven according to claim 1, wherein the outlet opening for the baked wafers is a self-closing opening.

34. Wafer baking oven according to claim 1, wherein the housing includes a ceiling wall and an exhaust which is part of the ceiling wall.

35. Wafer baking oven according to claim 1, wherein the housing includes a rear wall at said one side thereof, the housing also including a ceiling wall which joins the rear wall, the housing having an exhaust directly under the ceiling wall.

36. Wafer baking oven according to claim 34 or 35, wherein the exhaust includes an exhaustor having a first and second stage, said exhaustor suctioning off 50–400 times the volume of the front port per hour.

37. Wafer baking oven according to claim 36, wherein the second stage of the exhaustor is actuated by the opening of a part of the housing enclosure.

38. Wafer baking oven according to claim 1, wherein the housing includes a two-stage exhaustor, the exhaustor having a first and second stage, wherein the first stage removes at least the steam generated during the pouring of the batter in the housing of the front port and wherein the second stage is actuable by the opening of a part of the housing enclosure and exhausts an additional volume of air which reduces the temperature in the front port, when it is open, to a level acceptable to operating personnel.

39. Wafer baking oven according to claim 38, wherein the first stage of the exhaustor exhausts 50 to 100 times the volume of the housing of the front port and the second stage exhausts 200 to 400 times this volume.

40. Wafer baking oven according to claim 38, wherein the exhaust includes a bypass and wherein a heat recovery installation is coupled with the exhaust in said bypass, said installation condensing steam generated during pouring of the batter by the batter pouring station.

41. Wafer baking oven according to claim 1, wherein the discharge spider is arranged within the housing and adjacent to the outlet opening for the wafers in instances where the baked wafers are flat wafers or low hollow wafers.

42. Wafer baking oven according to claim 41, wherein the discharge spider has lateral sides, and a guide is provided laterally of the discharge spider, said guide revolving with said spider and limiting the path of the wafers.

43. Wafer baking oven according to claim 42, wherein the discharge spider is carried by a shaft having an axis and wherein two of said guides are mounted on the shaft of the discharge spider and spaced apart a certain mutual axial distance.

44. Wafer baking oven according to claim 43, wherein the mutual axial distance between the guides is adjustable.

45. Wafer baking oven according to claim 43, wherein the mutual axial distance between the guides corresponds to at least 1.00–1.2 times the width of a wafer measured transversely to the running direction of the baking tongs and corresponds to, at most, 1.005–1.3 times a diagonal length of a wafer.

46. Wafer baking oven according to claim 43, wherein each baking tong is openable for discharging a baked wafer and for receiving a fresh charge of batter and closeable for baking of the batter, each baking tong having a closing side at which closing and opening of the baking tong is most pronounced, each baking tong also having a closing roller for effecting closing thereof, one of said guides being arranged on the closing side of the baking tong, and wherein at least the one guide arranged on the closing side of the baking tong has a plurality of radial recesses for the closing roller of the baking tong.

47. Wafer baking oven according to claim 46, wherein each side is rotatable in a given direction about the axis of the shaft of the spider and each said radial recess has a boundary, the boundary having a boundary portion located forward of the remainder of the boundary when considered with respect to the direction of rotation of the guide, said forwardly located boundary portion having a sliding surface, arranged at incline with respect to the axis about which the guide rotates.

48. Wafer baking oven according to claim 42, wherein the guides have the configuration of dinner plates and include convex sides, the convex sides of the guides facing each other.

49. Wafer baking oven according to claim 43, wherein said baking tongs move on a track which has a curved part at one end, which curved part has a diameter, the spider having arms with ends which cooperate with said curved part of the track, the guides being in the shape of disks with a diameter equal to 0.5–1.5 times the diameter of the track part with which the ends of the arms of the discharge spider cooperate.

50. Wafer baking oven according to claim 43, wherein said baking tongs move on a track which has a curved part at one end, which curved part has a diameter, the spider having arms with ends which cooperate with said curved part of the track, the guides being in the shape of disks with a diameter equal to 0.9–1.1 times the diameter of the track part with which the ends of the arms of the discharge spider cooperate.

51. Wafer baking oven according to claim 43, wherein the outlet opening contributes to effecting exiting of the baked wafers from the front port in a certain path and in a certain direction of transport, and wherein an upper directing device limiting the path of the wafers in the upward direction and guiding them to the outlet opening is provided above the outlet opening for the wafers.

52. Wafer baking oven according to claim 51, wherein the housing has a front wall opposite to said front side, the outlet opening being located in the one wall, and wherein the upper directing device has the configuration of a guiding surface projecting from the front wall of the housing and extending into an area above the discharge spider.

53. Wafer baking oven according to claim 51, wherein the upper directing device comprises a baffle plate located at an incline to the path of the wafers exiting from the front port.

54. Wafer baking oven according to claim 51, wherein the upper directing device is composed of of a cylindrical surface which is curved, the curve defining a convex side, the convex side of which faces the path of the wafers.

55. Wafer baking oven according to claim 51, wherein the upper directing device comprises a plurality of rods arranged adjacent to each other located above the path of the wafers in the area of the outlet opening for the wafers.

56. Wafer baking oven according to claim 55, wherein the rods forming the upper directing device extend downwardly at an incline in the direction of the path of the wafers.

57. Wafer baking oven according to claim 55, wherein the rods forming the upper directing device are curved such that each has a convex side, the rods facing the path of the wafers with their convex sides.

58. Wafer baking oven according to claim 51, wherein lateral directing devices laterally limiting the path of the wafers and extending through the outlet opening for the wafers are provided in the housing, said lateral directing devices being pivotable around axes perpendicular to the path of the wafers.

59. Wafer baking oven according to claim 58, wherein the path of the wafers has a longitudinal center axis and wherein the pivoting, lateral directing devices have a section extending at an incline with respect to the longitudinal center axis of the path of the wafers.

60. Wafer baking oven according to claim 58, wherein the pivoting, lateral directing devices have pivoting axles on their front ends as viewed in the direction of transport of the wafers, with a section parallel to the wafer path extending from said pivoting axles, followed by a section which is laterally inclined with respect to the wafer path.

61. Wafer baking oven according to claim 58, wherein the pivoting lateral directing devices have pivoting axles about which they pivot and have ends opposite to the pivoting axles, said ends of the lateral directing devices engaging the rotating guides, the rotating guides being equipped with projections distributed over their circumference, said projections moving the pivoting lateral directing devices back and forth during the rotation of the rotating guides.

62. Wafer baking oven according to claim 58, wherein at least one of the pivoting lateral directing devices abuts against a rotating eccentric having a rotational axis perpendicular to the path of the wafers.

63. Wafer baking oven according to claim 60 or 61, wherein the pivoting lateral directing devices are biased in one pivoting direction by at least one tension spring located between two pivoting lateral directing devices.

64. Wafer baking oven according to claim 51, wherein baked wafers are discharged from the front port in a certain direction of transport and wherein the upper directing device comprises a pipe, equipped with one or more compressed air outlets, directed in the downward direction and arranged transversely to the direction of transport of the wafers.

* * * * *